(12) United States Patent  
Croft

(10) Patent No.: US 12,145,051 B2  
(45) Date of Patent: Nov. 19, 2024

(54) MULTI, SINGLE-AXIS GAME CONTROLLER

(71) Applicant: Box Dark Industries PTY, LTD., Brisbane (AU)

(72) Inventor: Phil Croft, Brisbane (AU)

(73) Assignee: Box Dark Industries Pty. Ltd., Queensland (AU)

( * ) Notice: Subject to any disclaimer, the term of this patent is extended or adjusted under 35 U.S.C. 154(b) by 365 days.

(21) Appl. No.: 17/270,498

(22) PCT Filed: Aug. 23, 2019

(86) PCT No.: PCT/AU2019/050891  
§ 371 (c)(1),  
(2) Date: Feb. 23, 2021

(87) PCT Pub. No.: WO2020/037374  
PCT Pub. Date: Feb. 27, 2020

(65) Prior Publication Data  
US 2021/0331065 A1    Oct. 28, 2021

(30) Foreign Application Priority Data  
Aug. 24, 2018 (AU) ................................ 2018903125

(51) Int. Cl.  
*A63F 13/24* (2014.01)

(52) U.S. Cl.  
CPC .................................... *A63F 13/24* (2014.09)

(58) Field of Classification Search  
None  
See application file for complete search history.

(56) References Cited

U.S. PATENT DOCUMENTS

| | | | |
|---|---|---|---|
| 6,544,124 B2 * | 4/2003 | Ireland | A63F 13/22 463/36 |
| 6,664,946 B1 * | 12/2003 | Stipes | G06F 3/0354 345/157 |
| 10,137,366 B1 * | 11/2018 | Quesnel | A63F 13/98 |
| D948,619 S * | 4/2022 | Yoo | D21/333 |
| 2005/0215321 A1 | 9/2005 | Hussaini et al. | |
| 2007/0249422 A1 * | 10/2007 | Podoloff | G06F 3/033 463/43 |
| 2019/0080592 A1 * | 3/2019 | Filatova | G08C 23/04 |

FOREIGN PATENT DOCUMENTS

| | | | | |
|---|---|---|---|---|
| DE | 10062013 A1 | 7/2002 | | |
| WO | WO-2009143568 A1 * | 12/2009 | ............. | A63F 13/06 |
| WO | 2015118082 A2 | 8/2015 | | |
| WO | 2017143404 A1 | 8/2017 | | |

* cited by examiner

*Primary Examiner* — Peter J Iannuzzi  
(74) *Attorney, Agent, or Firm* — Hinckley, Allen & Snyder; Stephen Holmes

(57) ABSTRACT

A multi, single-axis game controller including a pair of hand units in a spaced apart configuration, each hand unit configured to be held in one hand by the user and at least one of the pair of hand units having at least one button control pad and at least one thumb stick; and a switching actuator to at least temporarily reassign at least some input functionality from the at least one thumb stick to another control element provided on at least one of the hand units.

20 Claims, 5 Drawing Sheets

MULTI, SINGLE-AXIS GAME CONTROLLER

TECHNICAL FIELD

The present invention relates generally to the field of game controllers and more particularly to a multi, single-axis game controller and/or a convertible controller.

BACKGROUND ART

A conventional controller 10 will generally comprise a hard, outer case with a plurality of controls mounted about the controller. Typically, the controls include a set of direction buttons 11, a set of function buttons 12, a pair of analogue control sticks 13, a pair of bumpers 14, and a pair of triggers 15. An example of a conventional controller is shown in FIG. 1.

The analogue control sticks of the controllers assert control over two axes via potentiometers, that is one potentiometer measures left/right movement, and the other potentiometer measures up/down movement. Together they create a (dual axis) mini joystick control interface known as the thumb stick as illustrated in FIG. 3. Thumb sticks combine dual axis control in the one control input.

These controllers typically have a pair of bumper buttons 14 and a pair of trigger buttons 15, normally located on the top of the controller 10 to be accessible using the user's left and right index finger as needed, moving between the bumper button 14 and the trigger button 15 on the respective sides of the controller 10. The conventional positions of the bumper buttons and the triggers is shown in FIG. 2.

While useful, dual axis has limitations within some games that require precise rapid control inputs such as aiming and targeting in Battle Royale and First Person Shooter games—e.g. Up/down bias or interference while performing purely Left/right inputs, and left/right bias or interference while performing purely up/down inputs.

It will be clearly understood that, if a prior art publication is referred to herein, this reference does not constitute an admission that the publication forms part of the common general knowledge in the art in Australia or in any other country.

SUMMARY OF INVENTION

The present invention is directed to a multi, single-axis game controller, which may at least partially overcome at least one of the abovementioned disadvantages or provide the consumer with a useful or commercial choice.

With the foregoing in view, the present invention in one form, resides broadly in a multi, single-axis game controller including a pair of hand units in a spaced apart configuration, each hand unit configured to be held in one hand by the user and at least one of the pair of hand units having at least one button control pad and at least one thumb stick; and a switching actuator to at least temporarily reassign at least some input functionality from the at least one thumb stick to another control element provided on at least one of the hand units.

In a more detailed embodiment, the invention resides in an articulated game controller including a pair of hand units in a spaced apart configuration, each hand unit configured to be held in one hand by the user and at least one of the pair of hand units having at least one button control pad and at least one thumb stick; the pair of hand units associated with each other via at least one articulable joint to enable the user to maintain a grip on each respective hand unit without interference from the articulable joint, and wherein user input is provided to the controller through movement of the articulable joint and a switching actuator to at least temporarily reassign at least some input functionality from the at least one thumb stick to another control element provided on at least one of the hand units.

This invention relates particularly to control axis switching for video game consoles and PC video games, in particular the game controllers for consoles and PC.

The present invention may find use particularly with an articulated game controller such as that described in International Patent Publication No. WO/2017/143404 which is incorporated herein in its entirety.

Preferably, the pair of hand units includes a first hand unit and a second hand unit typically comprising a left hand unit and a right hand unit.

An articulable joint is preferably provided coupling the first hand unit and the second hand unit. The articulable joint may be at least partly enclosed by the first hand unit to enable the user to maintain a grip on the first hand unit without interference from the articulable joint. User input is typically provided to the controller through movement of the articulable joint, preferably using at least one or and preferably both of the first hand unit and the second hand unit.

Preferably, the articulable joint comprises a link, articulated with the at least one of the hand units and preferably with both of the first hand unit the second hand unit.

Preferably, the link is elongate. Preferably, the link is articulated with the first hand unit at one end of the link, and articulated with the second hand unit at an opposing end of the link.

Preferably, the first hand unit is pivotally attached to the link, and the second hand unit is pivotally attached to the link.

Preferably, the first and second hand units are configured to pivot around a first axis, and at least one of the first and second hand units is configured to pivot around a second axis. The second axis may be perpendicular to the first axis. The first and second hand units may be configured to pivot around the first axis independently of pivoting around the second axis.

Preferably, the first and second hand units are configured to pivot around an axis at the point at which the first hand unit is pivotally attached to the link, and an axis at the point at which the second hand unit is pivotally attached to the link. The first and second hand units may be configured to pivot around at least one axis parallel to the point(s) at which the respective hand units are pivotally attached to the link.

Preferably, the first and second hand units are configured to mimic a twisting or rotational motion (similar to a steering wheel) where the first and second hand units are rotated in opposite directions around the axis of the link.

Preferably, the first and second hand units are configured to pivot around ends of the link. The first and second hand units may be configured to pivot around axes perpendicular to a front surface of the controller.

Suitably, the first and second hand units are configured to mimic an up-down motion, where the first and second hand units are raised or lowered relative to each other, such that an angle is varied between the first hand unit and the link, and between the second hand unit and the link.

Preferably, the first and second hand units each include at least one extension portion for receiving respective ends of the link. In one form, each of the first and second hand units include a pair of spaced apart extension portions defining a channel for receiving respective ends of the link.

Preferably, the channels are elongate, and extend at least partially along a length of the first and second hand units.

Preferably, the channels are located on inside faces of each the first and second hand unit, that is the faces of the respective first and second hand units that face each other.

Preferably, the controller includes an interface, for communicating signals of the controller to a system to be controlled. The system to be controlled may comprise a personal computer or a video game console, for example.

Preferably, the interface is a wireless interface.

Preferably, the controller includes at least one sensor, coupled to the interface, the at least one sensor configured to sense relative movement of the first and second hand units. The at least one sensor may be configured to sense relative movement of the first and second hand units by sensing a movement of the first hand unit and/or the second hand unit with reference to the link.

Preferably, the link is configured to maintain the first and second hand units in a parallel arrangement.

Preferably, the link comprises first and second arms, pivotally coupled to the each of the left and right hand units. The first and second arms may be parallel, of equal length, and symmetrically positioned on or attached to the first and second hand units to form a parallelogram with the first and second units. The link may include a cover, covering the first and second arms.

The controller may include one or more resilient arrangements such as springs for example, configured to bias the articulable joint into a normal or home state or position.

Preferably, the controller includes at least one joypad on an upper portion of a front thereof, which enables the user to input left, right up and down motions. Normally the joypad will be provided on a front or forward side of one of the first hand unit or second hand unit.

Preferably, the controller includes one or more buttons on an upper portion of a front thereof, which enables the user to input selections. Normally the one or more buttons will be provided on a front or forward side of one of the first hand unit or second hand unit, and preferably on the other of the first hand unit or second hand unit to the joypad.

Preferably, the controller is substantially symmetrical. Preferably, the link is symmetrical.

Preferably, the controller is entirely handheld.

Preferably, the controller includes at least one joystick or thumbstick on an upper portion of a front thereof, which enables the user to input left, right up and down motions. In a preferred form, a pair of joysticks or thumbsticks are provided, typically one on each of the first hand unit and second hand unit. In providing input for certain games, one of the pair of joysticks or thumbsticks will be used to input information that is used by the game for movement direction and the other of the pair of joysticks or thumbsticks will be used to input information that is used by the game for viewing direction.

Each of the joysticks or thumbsticks are preferably provided on the respective hand units to be located relative to one of the user's thumbs for manipulation. Each of the joysticks or thumbsticks will typically function as a conventional joystick or thumbstick, including using depression of the joystick or thumbstick as an input until the switching actuator is used to at least temporarily reassign at least some input functionality to another control element provided on the controller.

Preferably, the controller includes at least one trigger actuator provided which enables a user to input a signal to fire or take another action. Preferably, a pair of trigger actuators is provided, normally on an underside of at least one and typically each of the hand units to be located relative to a user's forefinger when holding the controller.

Preferably, the controller includes at least one bumper actuator provided which enables a user to input a signal to fire or take another action. Preferably, a pair of bumper actuators is provided, normally provided on an underside of at least one and typically each of the hand units to be located relative to a user's forefinger when holding the controller.

In a particularly preferred embodiment, the bumper actuators are located away from the trigger area and remapped to paddles or buttons preferably located on an inboard side of each of the hand units accessible by the middle or ring fingers on both the left and right side when the user grips the controller with both hands.

Preferably, the controller includes at least one additional control element on at least one of the hand units located relative to one or more of the user's fingers. Normally, the at least one additional control element will be located on an underside of one or both of the hand units, preferably toward an inner side. The at least one additional control element may take any form but preferably will be or include at least one button or paddle.

Preferably an additional control element will be provided for each of the user's fingers, one each of the hand units. This may provide up to three additional control elements, on each of the hand units or up to six additional control elements in addition to the preferred pair of thumbsticks, pair of trigger actuators, pair of bumper actuators, joypad, button pad including one or more buttons substantially opposite to the joypad and the at least one articulable joint and sensor configuration.

Each of the additional control element(s) are preferably provided in a nonfunctioning configuration and are only actuated to function as a control element once the switching actuator is operated to temporarily reassign at least some of the input functionality from the at least one thumb stick to one or more of the additional control elements provided on at least one of the hand units. This reassignment of functionality can be switched on and off using the switching actuator.

Preferably, at least one switching actuator is provided. Preferably a single switching actuator is provided. The switching actuator may be provided in any location on the controller but preferably will be provided on the link, typically substantially centrally.

The switching actuator may preferably have the ability to switch at least some of the functionality in relation to at least one and preferably both of the thumbsticks (independently) to one or more of the other control elements of the controller. As mentioned above, the functionality from at least one and preferably both of the thumbsticks will preferably be switched to at least one additional control element but may be switched to a conventional control element instead such as a trigger, bumper or articulation.

The switching actuator may be provided with a number of positions (physical positions or electronic positions) giving the user the ability to select the desired position and the attendant switched functionality. The switching actuator can be a physical actuator with a number of selectable physical positions corresponding to separate locations or orientations of the switching actuator or alternatively, the switching actuator may be physical actuator button or switch which cycles or toggles electronically through a number of different electronic positions each with a different switching functionality.

For example, the switching actuator may cycle or toggle through the positions at each actuation as follows:
1. Left thumb stick L/R into articulation;
2. Right thumb stick L/R into articulation;
3. Left thumb stick up/down into lever;
4. Right thumb stick up/down into lever;
5. Left thumb stick L/R into wheel;
6. Right thumb stick L/R into wheel;
7. Left thumb stick up/down into trigger; and
8. Right thumb stick up/down into trigger.

The advantages of this are pure single axis control with no chance of interference from other inputs. Up/down control has no interference from left/right and left/right control has no interference from up/down. Each axis has been switched to its own unique control input, be it a thumb stick that now only handles one axis or another interface that also handles only one axis of control. As both axes can be manipulated independently, this can enable greater control that is swifter than dual axis control.

In certain cases, a single position may accomplish the switching of one or more than one thumbstick to one or more other control elements although this is more complex and will be more difficult for the user to become used to.

The switching actuator may be associated with a locking function as well which may lock the articulation of the controller when the switching actuator is not in a position which switches thumbstick function to articulation of the controller. In other words, when the controller is being used conventionally wit, the controller may be locked against articulation and when the switching actuator is used to reassign function from at least one of the thumbsticks to articulation of the controller, the switching actuator may also actuate unlocking of the actuation function of the controller.

The control elements available on the controller of the present invention therefore preferably include:
A pair of thumbsticks;
A pair of trigger actuators;
A pair of bumper actuators;
A joypad;
a button pad including one or more buttons substantially opposite to the joypad;
at least one articulable joint and sensor configuration; and
at least one button or other control element on at least one of the hand units located relative to one or more of the user's fingers
with at least some of the functionality from at least one of the thumbsticks being temporarily reassignable to at least one of the other control elements using the switching actuator.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, an articulated multi, single-axis game controller 16 is provided.

Figure 1:
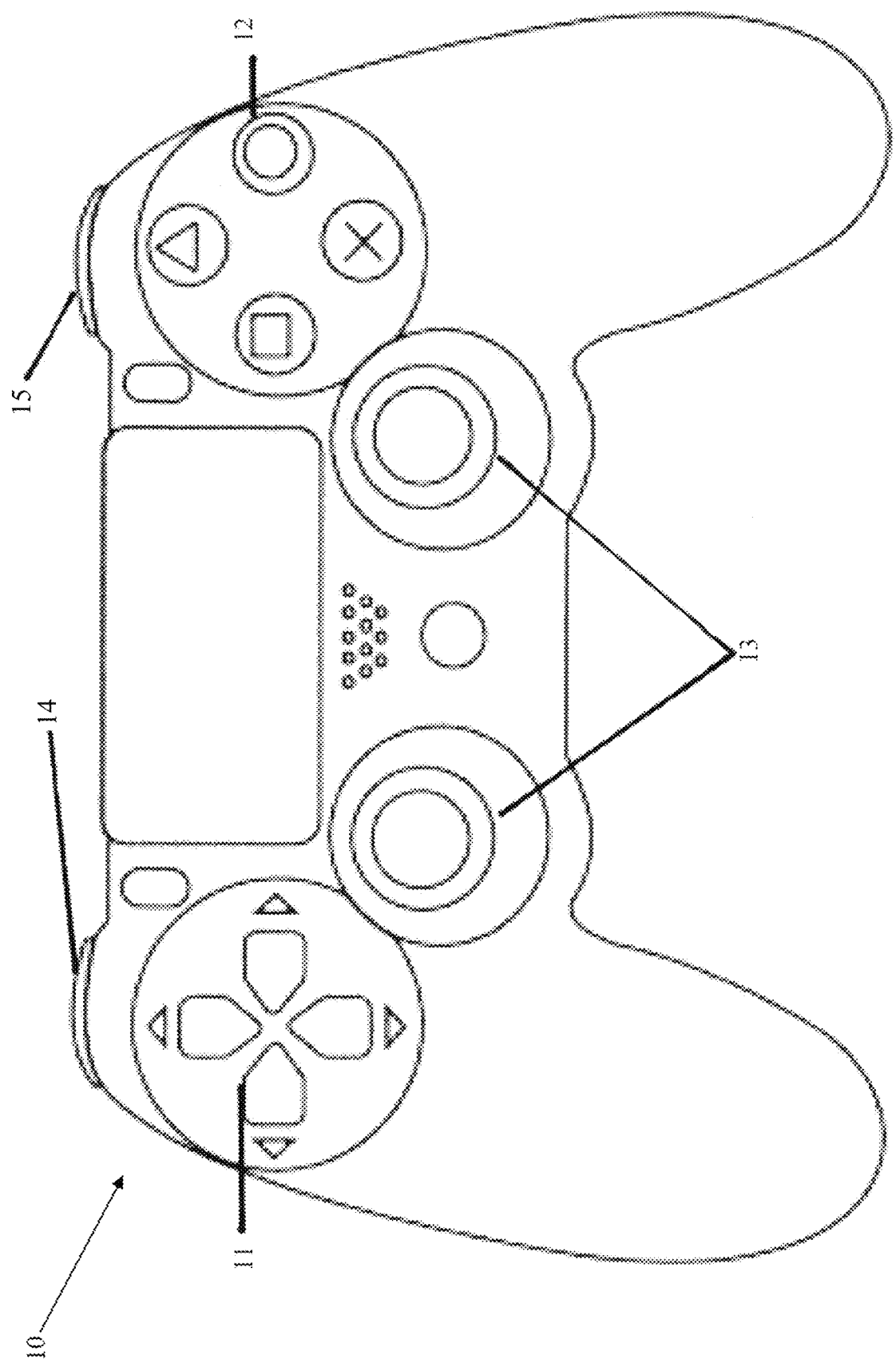
FIG. 1 is a front view of a conventional game controller.
Figure 2:
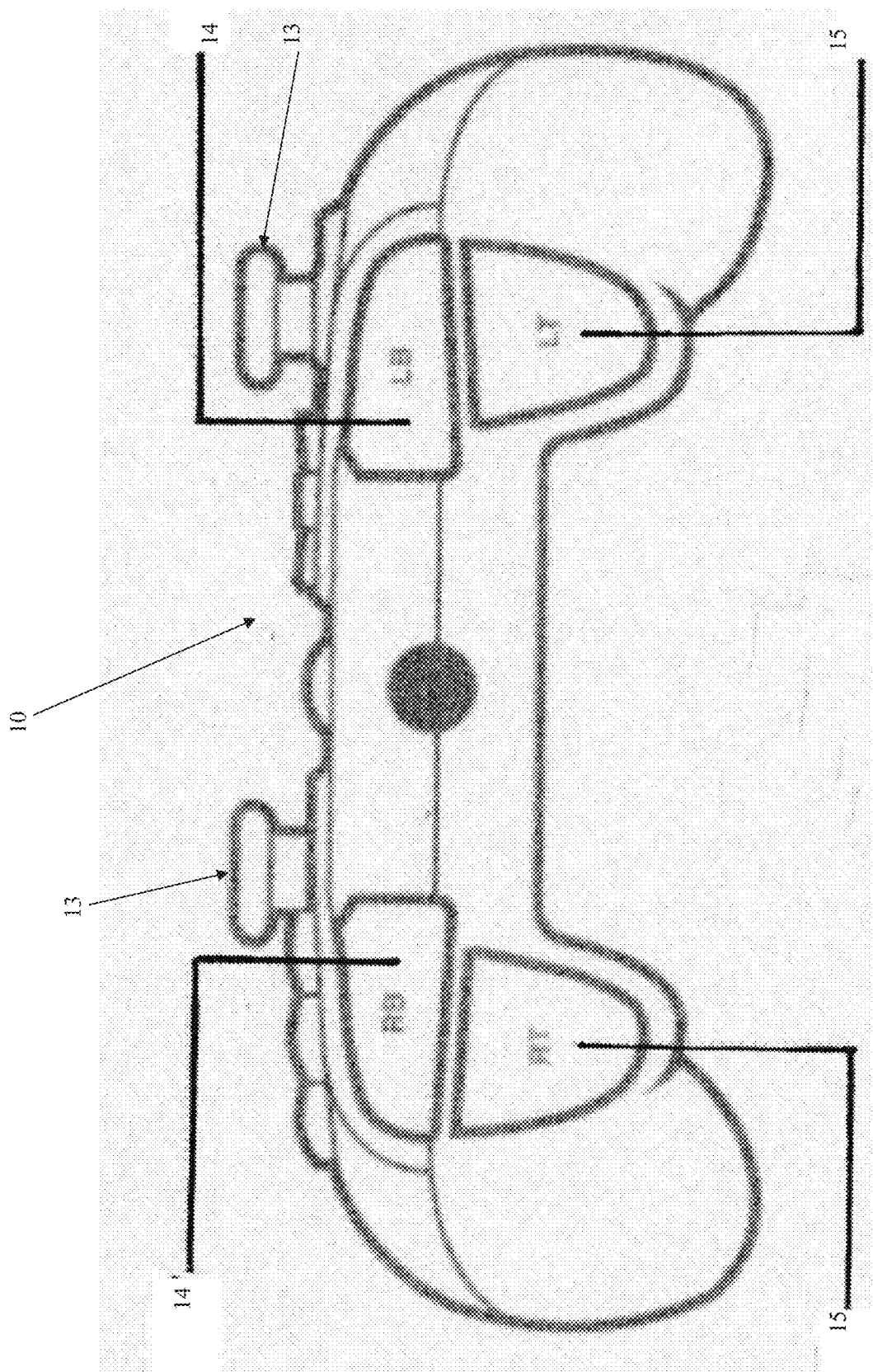
FIG. 2 is a view from above of a conventional game controller.
Figure 3:
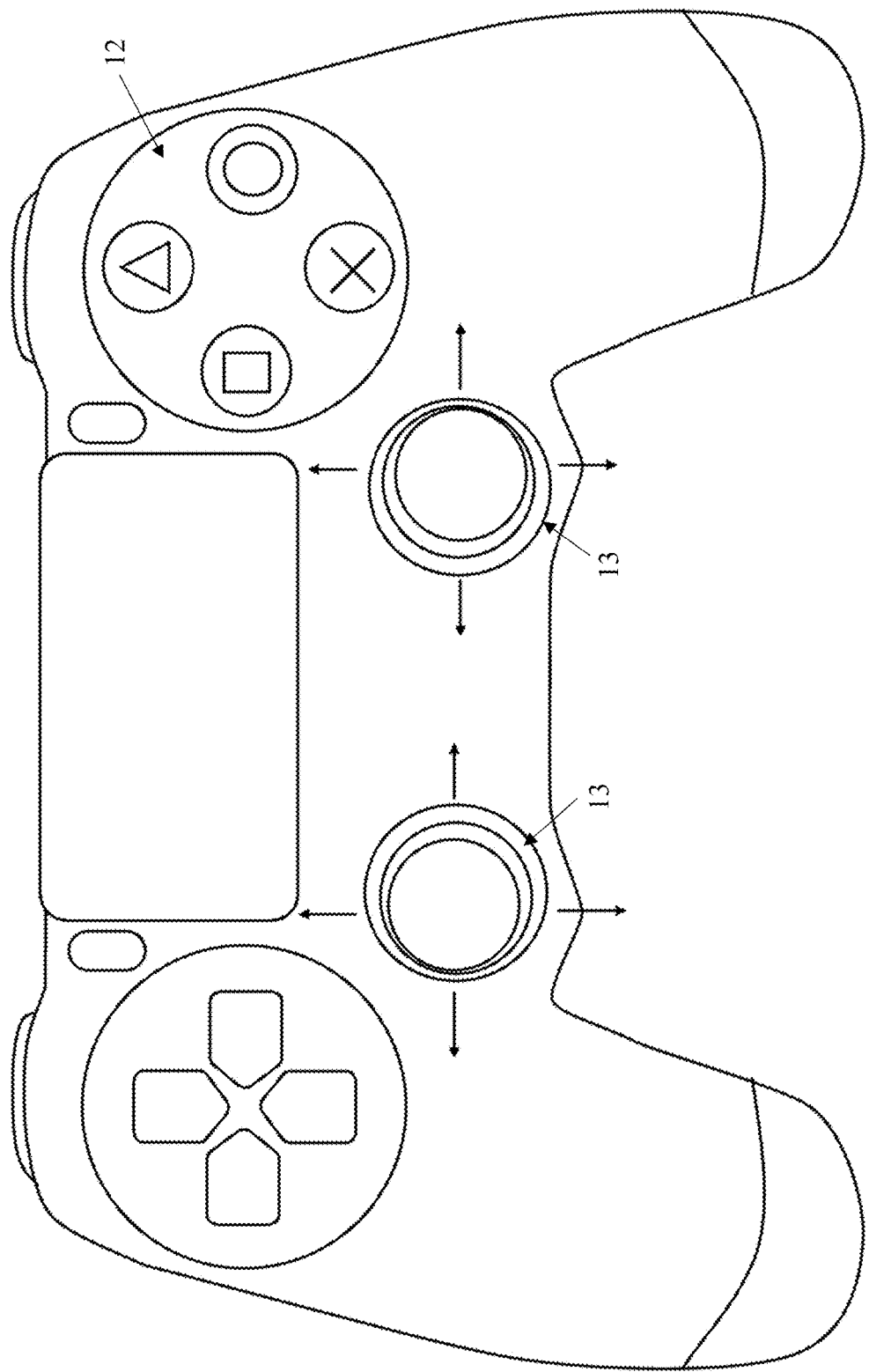
FIG. 3 is a schematic illustration showing the dual axis movement of the thumbsticks of a conventional controller.
Figure 4:
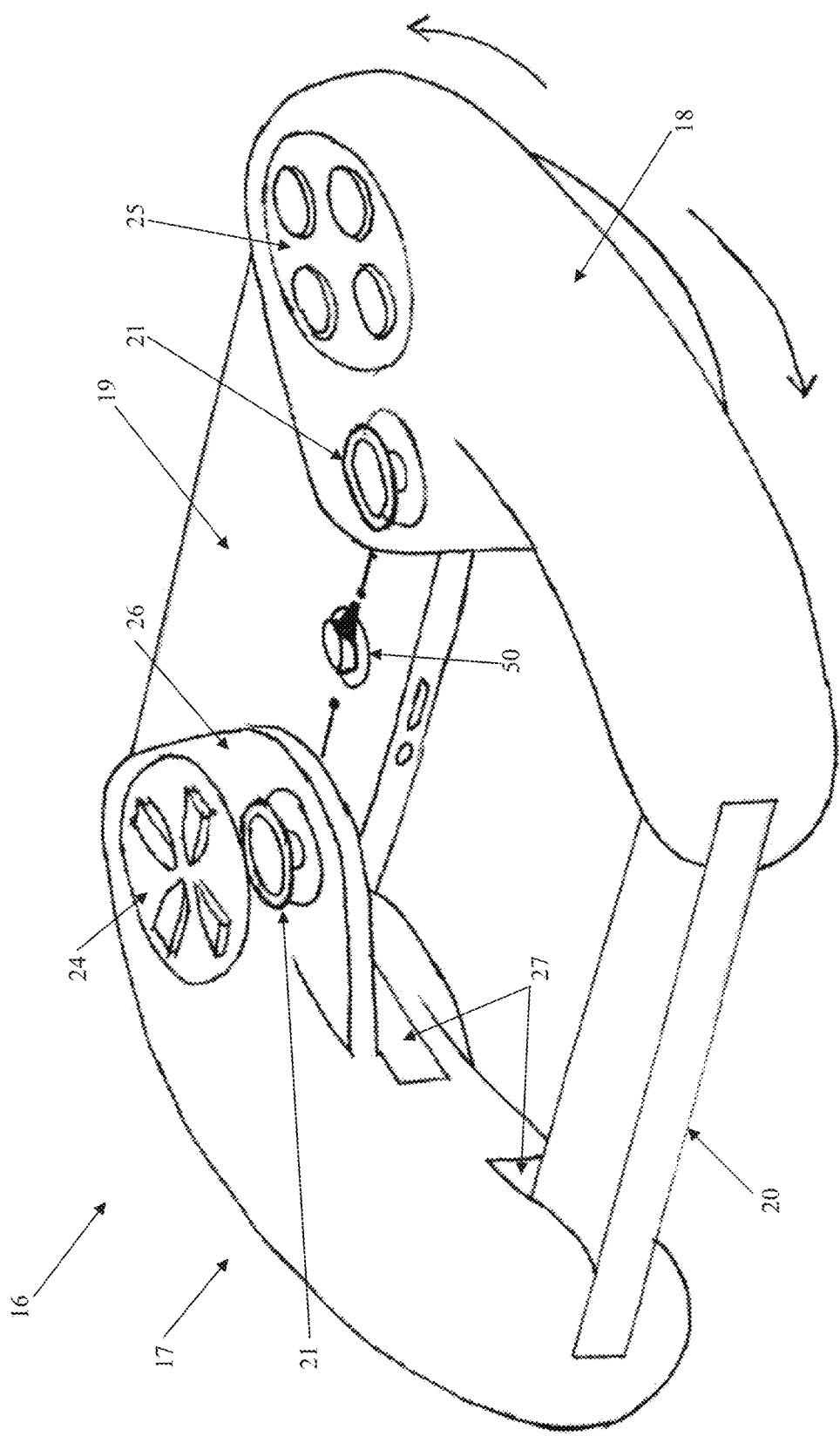
FIG. 4 is an isometric view of an articulated game controller according to a preferred embodiment of the present invention with switching actuator.
Figure 5:
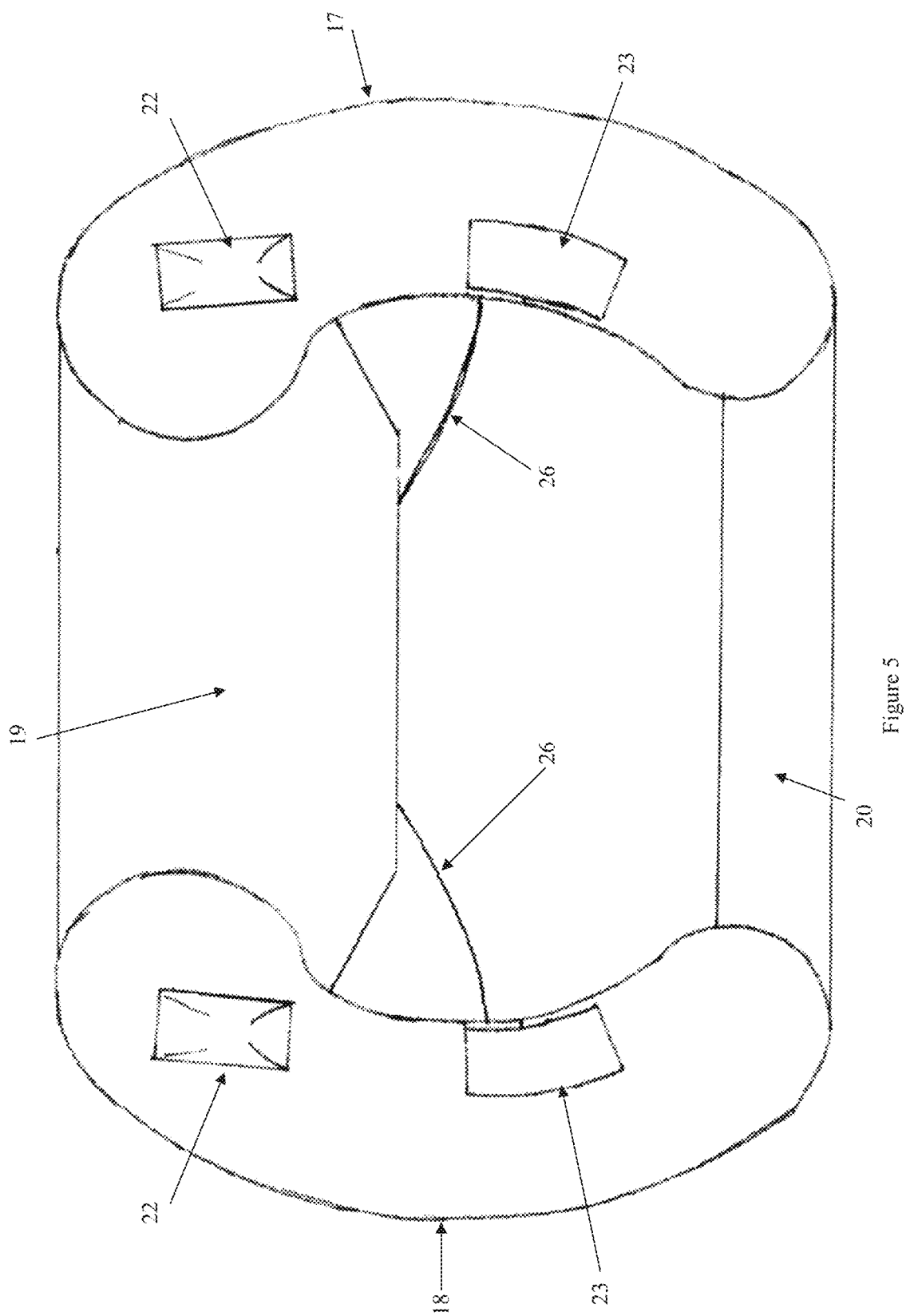
FIG. 5 is a view from below the controller illustrated in FIG. 5.

In the detailed embodiment illustrated in the Figures, the articulated game controller 16 includes a pair of hand units in a spaced apart configuration, a left hand unit 17 and a right hand unit 18. Each hand unit is configured to be held in one hand by the user. Each of the hand units have a button control pad and a thumb stick 21. As shown in FIG. 4, the pair of hand units are separated from one another by a pair of elongate links, an upper link 19 and a lower link 20. The upper link 19 and a lower link 20 mount the left hand unit 17 and a right hand unit 18 via an upper and a lower articulable joint to enable the user to maintain a grip on each respective hand unit without interference from the articulable joint. User input is provided to the controller through movement of the left hand unit 17 and a right hand unit 18 relative to one another about the articulable joints. A switching actuator 50 is provided on the upper link 19 to at least temporarily reassign at least some input functionality from the at least one of the thumb sticks 21 to another control element provided on at least one of the hand units 17, 18.

The control elements available on the controller 16 illustrated in FIG. 4 include:
A pair of thumb sticks 21;
A pair of trigger actuators 22 (relocated in the embodiment illustrated in FIG. 4 to the underside of the left hand unit 17 and a right hand unit 18);
A pair of bumper actuators 23 (relocated in the embodiment illustrated in FIG. 4 to the underside of the left hand unit 17 and a right hand unit 18);
A joypad 24 with direction buttons on the left hand unit 17;
a button pad 25 including one or more function buttons substantially opposite to the joypad 24, on the right hand unit 18; and
an upper and lower articulable joint and sensor configuration (obscured) on each of the left hand unit 17 and a right hand unit 18,
with at least some of the functionality from at least one of the thumbsticks 21 being temporarily reassignable to at least one of the other control elements using the switching actuator 50.

As illustrated, each articulable joint is at least partly enclosed by the hand units 17, 18 to enable the user to maintain a grip on the respective hand unit 17, 18 without interference from the articulable joint. User input is provided to the controller 16 through the control elements and/or movement of the hand units 17, 18 relative to one another about the articulable joints.

As shown, each of the links 19, 20 is elongate and articulated with the first hand unit at one end of the link, and articulated with the second hand unit at an opposing end of the link. The hand units 17, 18 are pivotally attached to both of the links 19, 20.

The first and second hand units 17, 18 are configured to pivot around an axis at the point at which the first hand unit is pivotally attached to the link, and an axis at the point at which the second hand unit is pivotally attached to the link to mimic a twisting or rotational motion (similar to a steering wheel) where the first and second hand units 17, 18 are rotated in opposite directions around the pivotal attachments to the respective links 19, 20.

The axes about which the first and second hand units 17, 18 are configured to pivot are perpendicular to a front surface (the surface relative to which the thumb stocks and the control buttons are provided) of the controller 16.

Suitably, the first and second hand units 17, 18 are configured to mimic an up-down motion, where the first and second hand units 17, 18 are raised or lowered relative to each other, such that an angle is varied between the first hand unit and the link, and between the second hand unit and the link.

As shown, the first and second hand units 17, 18 each include an extension portion for receiving respective ends of each of the links 19, 20 with the upper extension portion 26 mounting the thumb stick 21.

In the illustrated form, each of the first and second hand units 17, 18 include a channel 27 for receiving respective ends of the links, best illustrated in FIG. 4. The channels 27 are located on inside faces of each the first and second hand units 17, 18, that is the faces of the respective first and second hand units 17, 18 that face each other.

Preferably, the controller includes an interface, for communicating signals of the controller to a system to be controlled. The system to be controlled may comprise a personal computer or a video game console, for example. Preferably, the interface is a wireless interface.

The controller 16 includes at least one sensor, coupled to the interface, the at least one sensor configured to sense relative movement of the first and second hand units 17, 18 relative to one another. The at least one sensor may be configured to sense relative movement of the first and second hand units by sensing a movement of the first hand unit and/or the second hand unit with reference to the link(s).

As shown, the links 19, 20 are configured to maintain the first and second hand units 17, 18 in a parallel arrangement. The controller will generally include one or more resilient arrangements such as springs for example, configured to bias the articulable joints into a normal or home state or position.

The controller 16 includes at least one joypad 24 on an upper portion of a front thereof, which enables the user to input left, right up and down motions. Normally the joypad 24 is provided on a front or forward side of one of the left hand unit 17.

The controller also includes a function pad 25 with one or more buttons on an upper portion of a front thereof, which enables the user to input selections. Normally the function pad 25 is on a front or forward side of one of the right hand unit 18.

Preferably, the controller is substantially symmetrical. Preferably, the links are symmetrical. Preferably, the controller is entirely handheld.

The thumbsticks 21 on an upper portion of a front of each of the hand units 17, 18, enables the user to input left, right up and down motions. In a preferred form, a pair of thumbsticks 21 are provided as shown, one on each of the first hand unit and second hand unit. In providing input for certain games, one of the pair of thumbsticks 21 is used to input information that is used by the game for movement direction and the other of the pair of thumbsticks 21 is used to input information that is used by the game for viewing direction.

Each of the thumbsticks 21 are provided on the respective hand units to be located relative to one of the user's thumbs for manipulation. Each of the thumbsticks 21 will typically function as a conventional joystick or thumbstick, including using depression of the joystick or thumbstick as an input until the switching actuator 50 is used to at least temporarily reassign at least some input functionality to another control element provided on the controller 16.

As shown the controller 16 includes a pair of trigger actuators 22 provided which enables a user to input a signal to fire or take another action. Preferably, each of trigger actuators 22 is provided on an underside of at least one and typically each of the hand units to be located relative to a user's forefinger when holding the controller 16.

The controller also includes a pair of bumper actuator 23 provided which enables a user to input a signal to fire or take another action. Preferably, each of bumper actuators 23 is provided, provided on an underside of each of the hand units 17, 18 to be located relative to a user's forefinger when holding the controller 16.

In the preferred embodiment illustrated, the bumper actuators 23 are located away from the trigger area and remapped to paddles or buttons located on an underside of each of the hand units 17, 18 accessible by the middle or ring fingers on both the left and right side when the user grips the controller 16 with both hands.

In the illustrated embodiment, a single switching actuator 50 is provided on the upper link 19, typically substantially centrally.

The switching actuator preferably has the ability to switch at least some of the functionality in relation to at least one and preferably both of the thumbsticks 21 (independently) to one or more of the other control elements of the controller 16. As mentioned above, the functionality from at least one and preferably both of the thumbsticks 21 may be switched to at least one additional control element provided on the controller or to a conventional control element instead such as a trigger 22, bumper 23 or articulation.

The switching actuator 50 illustrated is a turn knob provided with a number of physical positions giving the user the ability to select the desired position and the attendant switched functionality. Two such positions are shown on the link 19 in FIG. 4. The positions are normally delineated on the link 19 and tactile and/or audible feedback will normally be provided to the user when the position is changed.

In the illustrated embodiment, the switching actuator 50 cycles or toggle through the positions at each delineation as follows:

1. Left thumb stick L/R into articulation;
2. Right thumb stick L/R into articulation;
3. Left thumb stick up/down into lever;
4. Right thumb stick up/down into lever;
5. Left thumb stick L/R into wheel;
6. Right thumb stick L/R into wheel;
7. Left thumb stick up/down into trigger; and
8. Right thumb stick up/down into trigger.

The advantages of this are pure single axis control with no chance of interference from other inputs. Up/down control has no interference from left/right and left/right control has no interference from up/down. Each axis has been switched to its own unique control input, be it a thumb stick that now only handles one axis or another interface that also handles only one axis of control. As both axes can be manipulated independently, this can enable greater control that is swifter than dual axis control.

In certain cases, a single position may accomplish the switching of one or more than one thumbstick to one or more other control elements although this is more complex and will be more difficult for the user to become used to.

The switching actuator may be associated with a locking function as well which may lock the articulation of the controller when the switching actuator is not in a position which switches thumbstick function to articulation of the controller. In other words, when the controller is being used conventionally wit, the controller may be locked against articulation and when the switching actuator is used to reassign function from at least one of the thumbsticks to articulation of the controller, the switching actuator may also actuate unlocking of the actuation function of the controller.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A multi, single-axis game controller comprising:
a pair of hand units in a spaced apart configuration, each hand unit configured to be held in one hand by the user and at least one of the pair of hand units having at least one button control pad and at least one thumb stick; and
a switching actuator comprising a physical button or switch, the physical button or switch configured to cycle or toggle between a number of positions, each position with different functionality to at least temporarily reassign at least some input functionality from the at least one thumb stick to another control element provided on at least one of the hand units, the other control element for receiving user input in place of the at least one thumb stick.

2. The multi, single-axis game controller as claimed in claim 1, wherein the pair of hand units include a first hand unit and a second hand unit, and the controller further includes an articulable joint for coupling the first hand unit and the second hand unit.

3. The multi, single-axis game controller as claimed in claim 2, wherein the articulable joint is at least partly enclosed by the first hand unit to enable the user to maintain a grip on the first hand unit without interference from the articulable joint.

4. The multi, single-axis game controller as claimed in claim 2, wherein the articulable joint comprises a link, articulated with the at least one of the hand units.

5. The multi, single-axis game controller as claimed in claim 4, wherein the link is articulated with the first hand unit at one end of the link, and articulated with the second hand unit at an opposing end of the link.

6. The multi, single-axis game controller as claimed in claim 4, wherein the first hand unit is pivotally attached to the link, and the second hand unit is pivotally attached to the link.

7. The multi, single-axis game controller as claimed in claim 4, wherein the first and second hand units are configured to pivot around a first axis, and at least one of the first and second hand units is configured to pivot around a second axis.

8. The multi, single-axis game controller as claimed in claim 4, wherein the first and second hand units are configured to pivot around an axis at the point at which the first hand unit is pivotally attached to the link, and an axis at the point at which the second hand unit is pivotally attached to the link, wherein the first and second hand units are configured to mimic a twisting or rotational motion where the first and second hand units are rotated in opposite directions around the axis of the link.

9. The multi, single-axis game controller as claimed in claim 4, wherein the first and second hand units are configured to pivot around ends of the link.

10. The multi, single-axis game controller as claimed in claim 4, wherein the first and second hand units are configured to mimic an up-down motion, where the first and second hand units are raised or lowered relative to each other, such that an angle is varied between the first hand unit and the link, and between the second hand unit and the link.

11. The multi, single-axis game controller as claimed in claim 4, wherein each of the first and second hand units include a pair of spaced apart extension portions defining a channel for receiving respective ends of the link, and wherein the channels are located on inside faces of each the first and second hand unit.

12. The multi, single-axis game controller as claimed in claim 4, wherein the controller further includes an interface for communicating signals of the controller to a system to be controlled.

13. The multi, single-axis game controller as claimed in claim 12, wherein the interface is a wireless interface.

14. The multi, single-axis game controller as claimed in claim 12, wherein the controller further includes at least one sensor, coupled to the interface, the at least one sensor configured to sense relative movement of the pair of hand units, and wherein the at least one sensor may be configured to sense relative movement of the pair of hand units by sensing a movement of the one or both of the pair of hand units with reference to the link.

15. The multi, single-axis game controller as claimed in claim 4, wherein the link is configured to maintain the first and second hand units in a parallel arrangement.

16. The multi, single-axis game controller as claimed in claim 4, wherein the link comprises first and second arms, pivotally coupled to the each of the left and right hand units.

17. The multi, single-axis game controller as claimed in claim 2, wherein controller further includes one or more resilient arrangements configured to bias the articulable joint into a normal or home state or position.

18. The multi, single-axis game controller as claimed in claim 1, wherein the controller further includes at least one additional control element on at least one of the hand units located relative to one or more of a user's fingers, wherein an additional control element is provided for each of the user's fingers, on each of the hand units, and wherein each of the additional control elements is provided in a nonfunctioning configuration and are only actuated to function as a control element once the switching actuator is operated to temporarily reassign at least some of the input functionality from the at least one thumb stick to one or more of the additional control elements provided on at least one of the hand units.

19. The multi, single-axis game controller as claimed in claim 1, wherein the switching actuator is associated with a locking function.

20. An articulated game controller comprising:

a pair of hand units in a spaced apart configuration, each hand unit configured to be held in one hand by the user and at least one of the pair of hand units having at least one button control pad and at least one thumb stick; the pair of hand units associated with each other via at least one articulable joint to enable the user to maintain a grip on each respective hand unit without interference from the articulable joint, and wherein user input is provided to the controller through movement of the articulable joint; and a switching actuator comprising a physical button or switch, the physical button or switch configured to cycle or toggle between a number of positions, each position with different functionality to at least temporarily reassign at least some input functionality from the at least one thumb stick to another control element provided on at least one of the hand units, the other control element for receiving user input in place of the at least one thumb stick.

* * * * *